(12) United States Patent
Staser et al.

(10) Patent No.: US 6,305,740 B1
(45) Date of Patent: Oct. 23, 2001

(54) AUTOMOTIVE VEHICLE HAVING MOVEABLE ROOF PANEL

(75) Inventors: Brian Hale Staser, Troy; Lloyd Walker Rogers, Jr., Shelby Township; Geoffrey Barr, Troy; Stephen George Griffin, Rochester Hills; Ronald James Wilde, St. Clair Shores, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/645,744

(22) Filed: Aug. 24, 2000

Related U.S. Application Data
(60) Provisional application No. 60/155,745, filed on Sep. 23, 1999.

(51) Int. Cl.[7] .................................................. B60J 7/053
(52) U.S. Cl. ...................................... 296/222; 296/216.05
(58) Field of Search ........... 296/216.04, 216.05–216.08, 296/222; 224/309, 326

(56) References Cited

U.S. PATENT DOCUMENTS

| 3,981,531 | * | 9/1976 | Koral et al. ........................ 396/222 |
| 4,272,121 | * | 6/1981 | Kim ............................ 296/216.04 X |

FOREIGN PATENT DOCUMENTS

0139429 * 6/1991 (JP) ...................................... 296/222

* cited by examiner

Primary Examiner—Dennis H. Pedder
(74) Attorney, Agent, or Firm—Patrick M. Griffin

(57) ABSTRACT

An automotive vehicle has a power operated moveable roof panel that moves between an open position above a fixed roof panel and a closed position behind the fixed roof panel. The moveable roof panel is guided by forward and rearward roller assemblies at each side that travel in respective forward and rearward tracks exclusively. The forward roller assemblies have forward rollers, rearward rollers and guide rollers that cooperate with drops in the forward tracks to push the moveable roof panel down in the closed position. The vehicle has an optional luggage rack and an optional interior partition between the passenger compartment and the cargo compartment that includes a moveable glass panel.

7 Claims, 5 Drawing Sheets

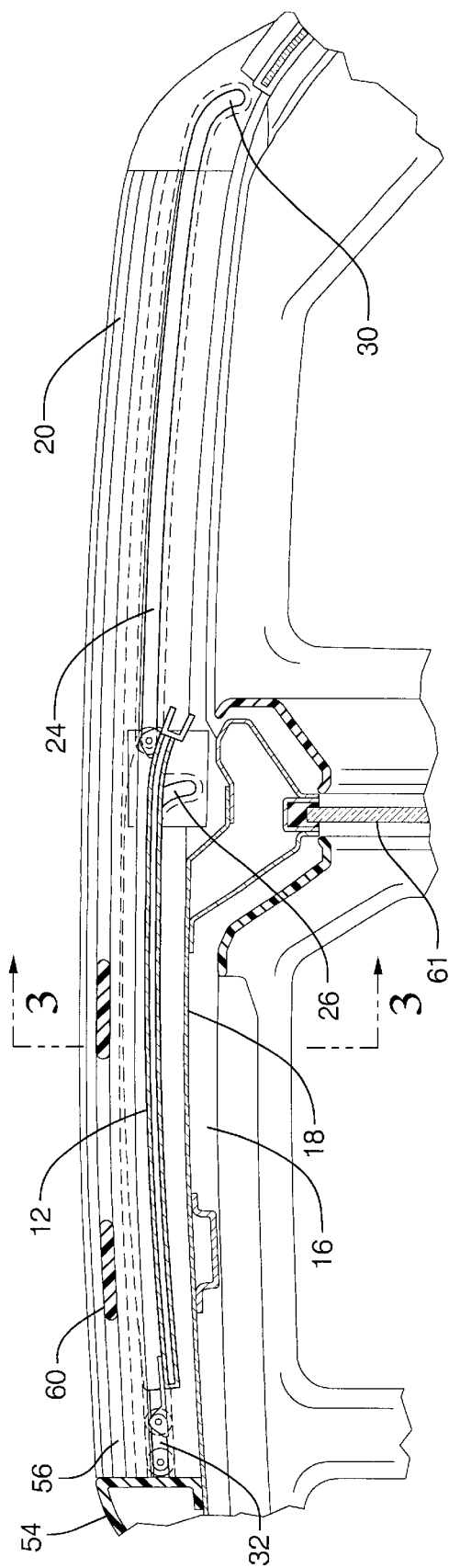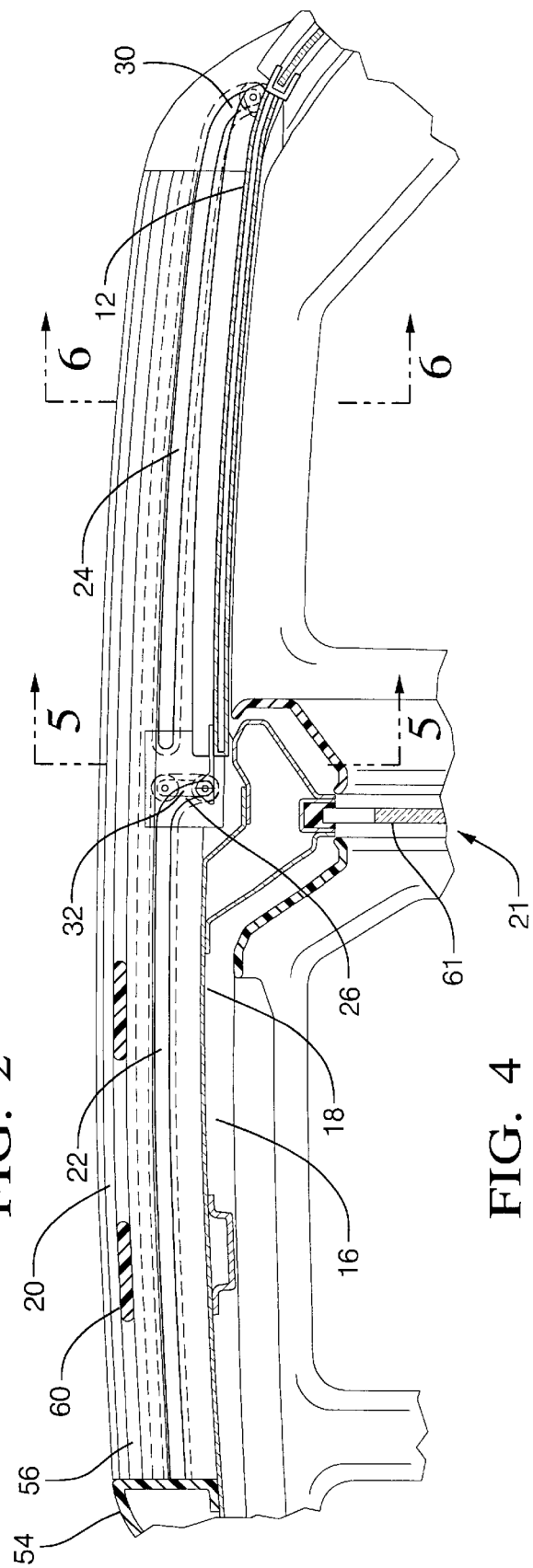

AUTOMOTIVE VEHICLE HAVING MOVEABLE ROOF PANEL

RELATED APPLICATION

This invention claims priority of prior provisional patent application Ser. No. 60/155,745 filed Sep. 23, 1999.

FIELD OF THE INVENTION

This invention relates generally to automotive vehicles and more particularly to an automotive vehicle having a moveable roof panel.

BACKGROUND OF THE INVENTION

Automotive vehicles having moveable roof panels are already known. A popular type is the so called moon roof where a section of the roof of a passenger vehicle, usually the center section over the front seat, drops down slightly and slides back into a storage compartment between inner and outer roof panels. While popular, the moon roof has disadvantages. The moon roof cannot extend the full width of the vehicle and generally is relatively narrow. Moreover installation usually requires lowering the inner roof panel which reduces head room in the front seat.

SUMMARY OF THE INVENTION

The invention provides an automotive vehicle having a moveable roof panel that extends for the full width of the vehicle. The moveable roof is stored above the outer panel of the roof in the open position so that head room is not reduced. When installed in a station wagon or the like, the movable roof preferably exposed the cargo floor of the station wagon in the open position thus allowing transport of tall articles.

BRIEF DESCRIPTION OF THE DRAWINGS

FIG. 2 is a partial longitudinal section of the automotive vehicle taken substantially along the line 2—2 of FIG. 1 looking in the direction of the arrows showing the moveable roof panel in the open position;

FIG. 4 is a partial longitudinal section of the automotive vehicle similar to FIG. 2 showing the moveable roof panel in the closed position;

DETAILED DESCRIPTION OF PREFERRED EMBODIMENT

Figure 1:
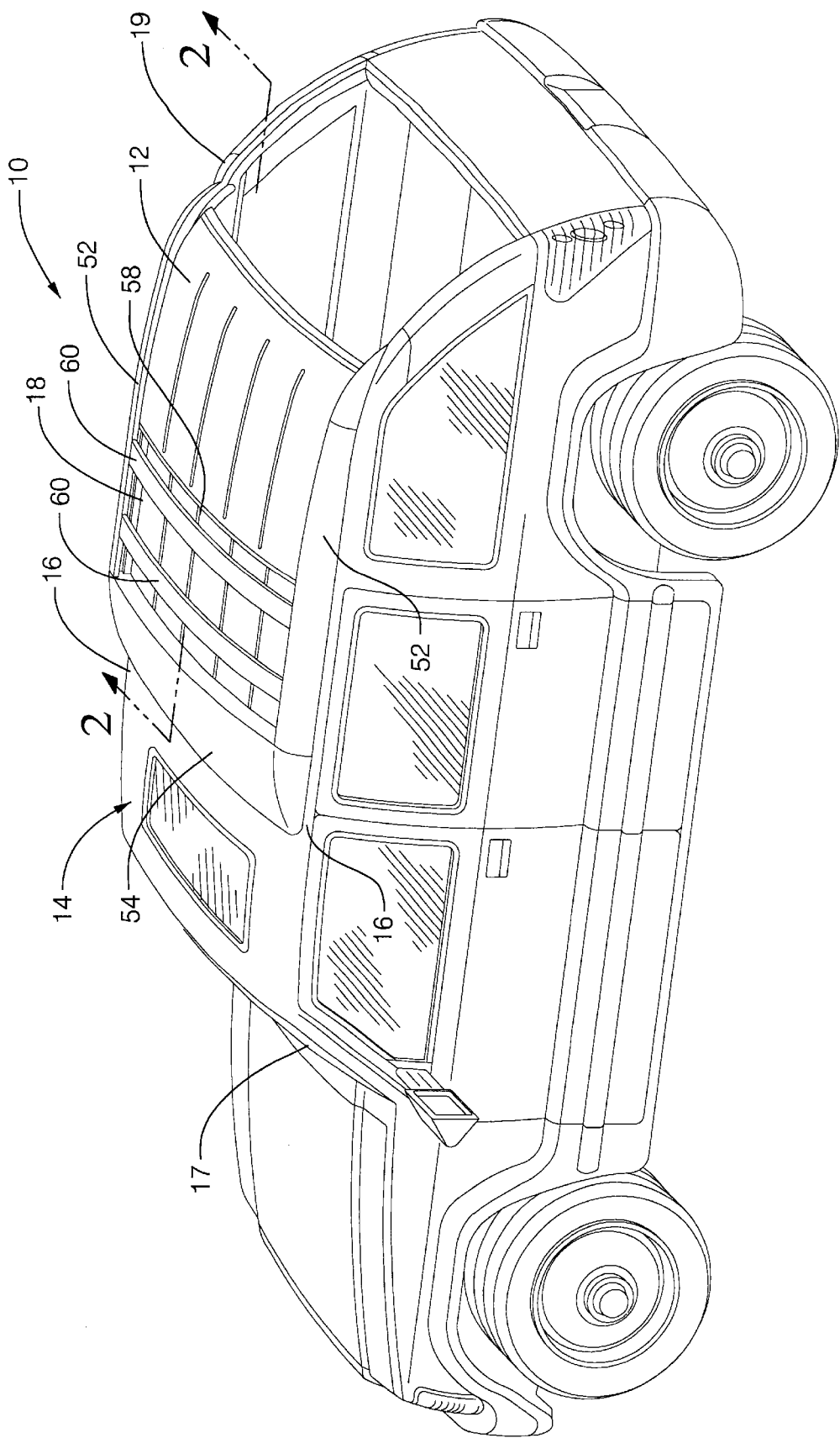
FIG. 1 is a perspective view of an automotive vehicle equipped with a moveable roof panel in accordance with the invention.

Referring now to FIG. 1 of the drawing, automotive vehicle 10 which has a moveable roof panel 12 in accordance with the invention is illustrated with the moveable roof panel 12 in the partially open position.

Automotive vehicle 10 is illustrated as a station wagon or sport utility vehicle that has a vehicle body 14 that includes laterally spaced longitudinal structures 16 that are often sheet metal box sections. These longitudinal structures extend from the A-pillars 17 for the windshield to the D-pillars 19 for the tailgate. Vehicle body 14 has a fixed roof panel 18 secured to body structures 16 over the forward portion of the vehicle compartment from the A-pillars 17 to the C-pillars 21, which corresponds more or less to the passenger area of the vehicle compartment.

The rearward portion of the vehicle compartment which corresponds more or less to the cargo area is covered by the moveable roof panel 12 that moves between an open position shown in FIG. 2 and a closed position shown in FIG. 4. Rails 20 are attached to the respective longitudinal structures 16 for guiding the moveable roof panel 12 between the open position above the fixed roof panel 18 shown in FIG. 2 and the closed position aligned behind the fixed roof panel 18 shown in FIG. 4.

Figure 3:
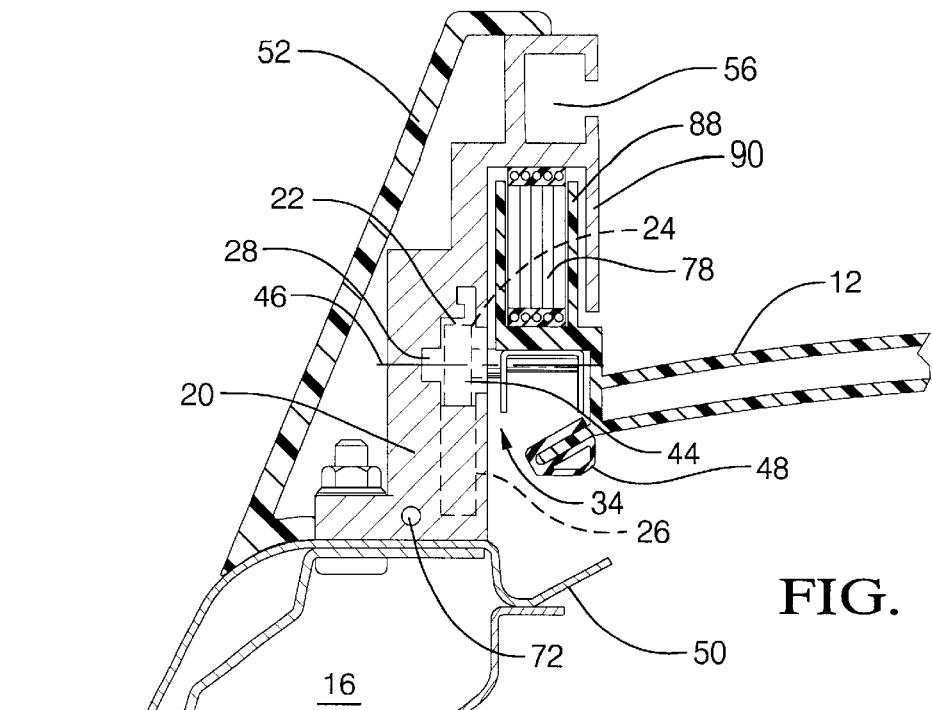
FIG. 3 is a section taken substantially along the line 3—3 of FIG. 2 looking in the direction of the arrows.
Figure 5:
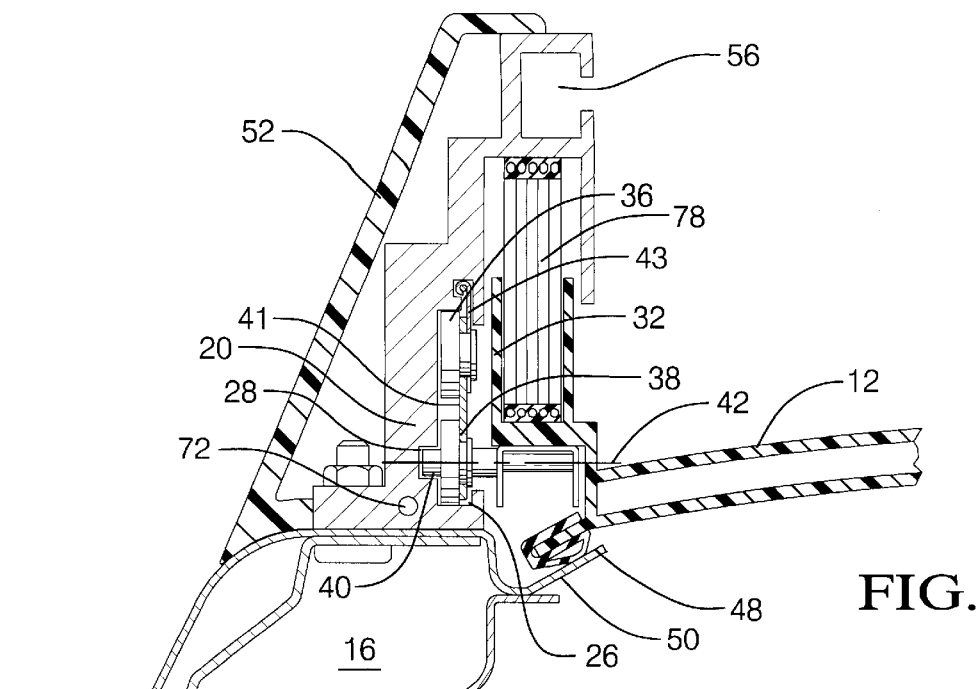
FIG. 5 is a section taken substantially along the line 5—5 of FIG. 4 looking in the direction of the arrows.

Rails 20 having forward tracks 22 and rearward tracks 24 for guiding the forward and aft ends of the moveable roof panel 12 respectively. Forward tracks 22 have drops 26 at their respective aft ends in the vicinity of C-pillars 21 for moving the forward end of roof panel 12 down into alignment with the fixed roof panel 18. Forward tracks 22 also have guide grooves 28 that follow drops 26 as best shown in FIGS. 3 and 5. The function and purpose of guide grooves 28 is discussed below. Rearward tracks 24 also have drops 30 at their respective aft ends for moving the aft end of roof panel 12 down into alignment with the fixed roof panel 18.

Figure 6:
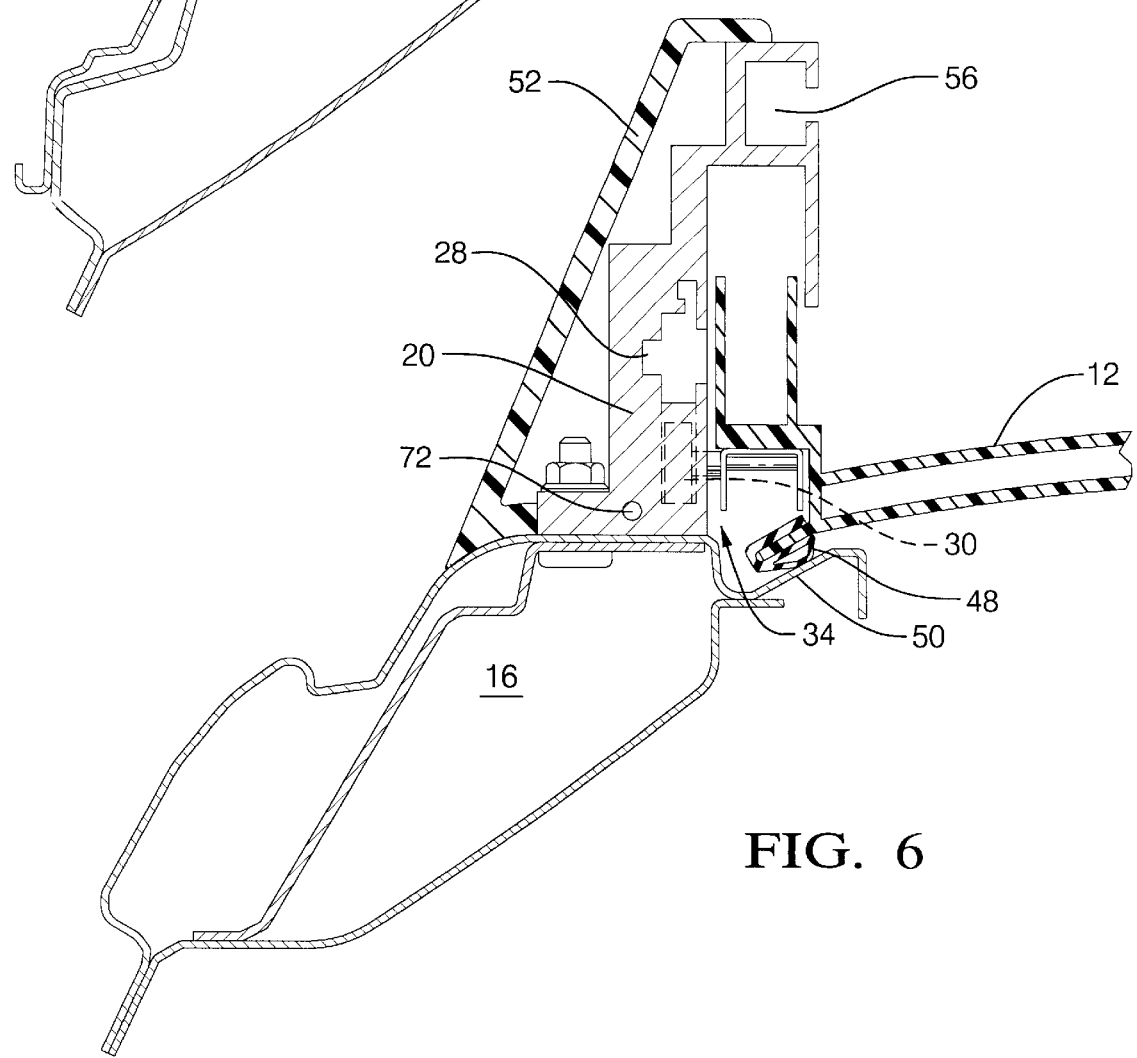
FIG. 6 is a section taken substantially along the line 6—6 of FIG. 4 looking in the direction of the arrows.

Moveable roof panel 12 has a forward roller assembly 32 at the forward end of each side (FIG. 5) and a rearward roller assembly 34 at the rearward end of each side (FIGS. 3 and 6). Forward roller assemblies 32 travel in forward tracks 22 exclusively. Rearward roller assemblies 34 travel in rearward tracks 24 exclusively. Each forward roller assembly 32 has two large support rollers, 36, 38 and a small guide roller 40 that are disposed in the respective forward track 22 and guide groove 28 of an associated rail 20. Support roller 36 is forward of support roller 38 which is concentric with guide roller 40. Support roller 38 and guide roller 40 rotate on axis 42 that is fixed with respect to movable roof panel 12 while roller 36 rotates on a link 41 that pivots on axis 42 so that the rearward roller 38 is pressed down into drop 26 as explained below.

Each rearward roller assembly 34 has a support roller 44 that is disposed in the rearward track 24 of rail 20 exclusively. Rollers 44 rotate on axes 46 that are fixed with respect to moveable roof panel 12.

As roof panel 12 moves rearwardly from the open position shown in FIG. 2 to the closed position shown in FIG. 4, the roof panel 12 simply moves along in an elevated position until the roof panel 12 approaches the closed position shown in FIG. 4. In this mode support roller 36 and 38 of each forward roller assembly 32 are travelling in tandem in one of the forward tracks 22. As the roof panel approaches the closed position, support rollers 44 of the rearward roller assemblies 34 roll into drops 30 at the aft end of rearward tracks 24. At the same time rearward support rollers 38 of the forward roller assemblies 32 being guided by guide rollers 40, roll into drops 26 at the aft end of forward tracks 22. The forward support rollers 36 of the forward roller assemblies 32, however, being attached to pivotable links 41, continue straight ahead and move up over and over center of the rearward support rollers 38. This presses rearward support rollers 38 down into the drops 26 and locks the roof panel 12 in the closed position by virtue of the over center position of forward support rollers 36. The closing force also presses support rollers 44 of the rearward roller assemblies 34 down into the drops 30. This action presses the moveable roof panel 12 down into alignment with the fixed roof panel 18 and also presses the moveable roof panel 12 down so that elastomeric seal strips 48 carried by roof panel 12 are biased into good sealing engagement with seal surfaces 50 of longitudinal structures 16.

Rails 20 are preferably covered by outer trim panels 52 that blend into the vehicle body aesthetically with the forward ends of trim panels 52 connected by an air dam 54 that also blends into the vehicle body aesthetically.

Rails 20 may also include upper tracks 56 that run above the first and second tracks 22, 24 for providing a luggage carrier 58 which is generally desired in station wagons and sport utility vehicles. Luggage carrier is completed by cross members 60 that are secured to rails 20 in conjunction with upper tracks 56. Cross members 60 are preferably adjustable secured in the tracks to provide greater versatility.

Another optional feature that can be incorporated in the vehicle is a moveable glass panel 61 that is associated with C-pillars 21 and a lower partition (not shown) that extends between the C-pillars. Glass panel 61 would normally be lowered and preferably completely stored in the lower partition when the moveable roof panel 12 is in the closed position shown in FIG. 4. However, when the moveable roof panel 12 is partially opened or fully opened as shown in FIG. 2, glass panel 61 could be raised to the position shown in FIG. 2 sealing the passenger compartment from the open cargo compartment behind C-pillars 21.

Figure 7:
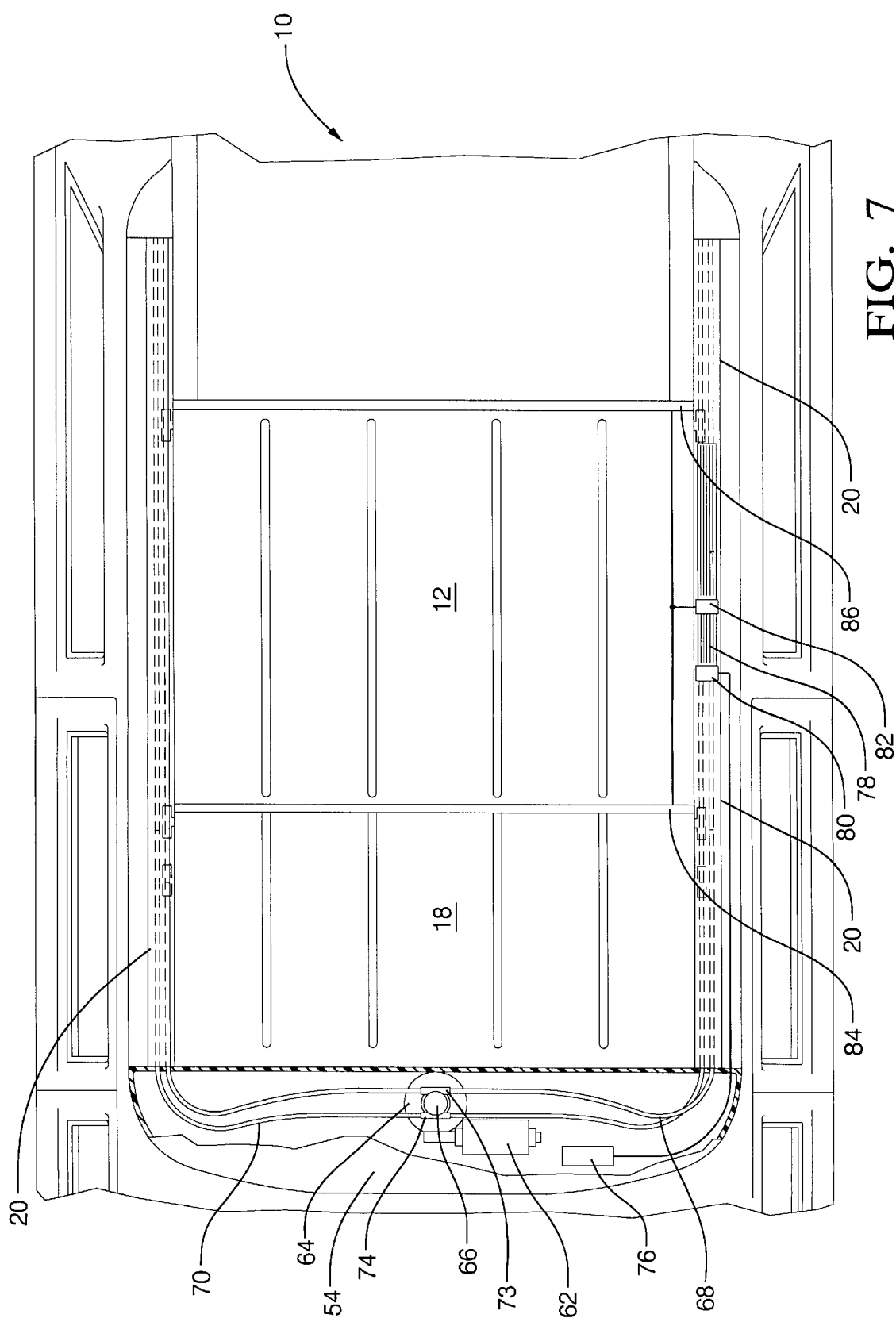
FIG. 7 is a fragmentary, partially sectioned top view of the vehicle shown in FIG. 1.

The moveable roof panel 12 is preferably power operated. A typical power unit is illustrated in FIG. 7. The power unit is located behind the air dam 54 and comprises an electrical motor 62 that drives gear reduction unit 64 that drives an output sprocket 66. Two flexible drive cables 68 and 70 drivingly engage opposite sides of sprocket 66. One end of cable 68 is attached to a drive link 43 that is rotatably attached to the hub of the forward support roller 36 at the right side as viewed in FIG. 7. The opposite end portion of cable 68 slides in a channel 72 in the fixed rail 20 at the left side of roof 18 as viewed in FIG. 7. Cable 70 is attached to a drive link 43 that is rotatably attached to the hub of the forward support roller 36 at the left side at one end with its opposite end portion slideably in a channel in the fixed rail 20 at the right side of roof 18. With such an arrangement, the moveable roof panel 12 is pulled forward when sprocket 66 is rotated clockwise and pushed rearward when sprocket 66 is rotated counterclockwise. Guide tabs 73 and 74 are provided at sprocket 66 for cables 68 and 70 respectively. Other guides may be provided as needed.

Motor 62 is energized by a motor controller 76 that receives activation signals from the driver and obstacle detection signals from the moveable roof panel 12 via a flat flexible cable 78 having electrical connectors 80 and 82 at opposite ends. Connector 80 is attached to track 20 and connected to controller 76 electrically while connector 82 is attached to moveable roof panel 12 and connected to sensors 84 and 86 electrically. Sensor 84 at the front end of movable roof panel 12 generates a signal if roof panel 12 hits an obstacle while opening; the signal being sent to controller 76 which then reverses the travel of the roof panel 12 per preprogrammed directions. Sensor 86 at the aft end of roof panel 12 generates a signal if roof panel 12 hits an obstacle while closing.

Figure 8:
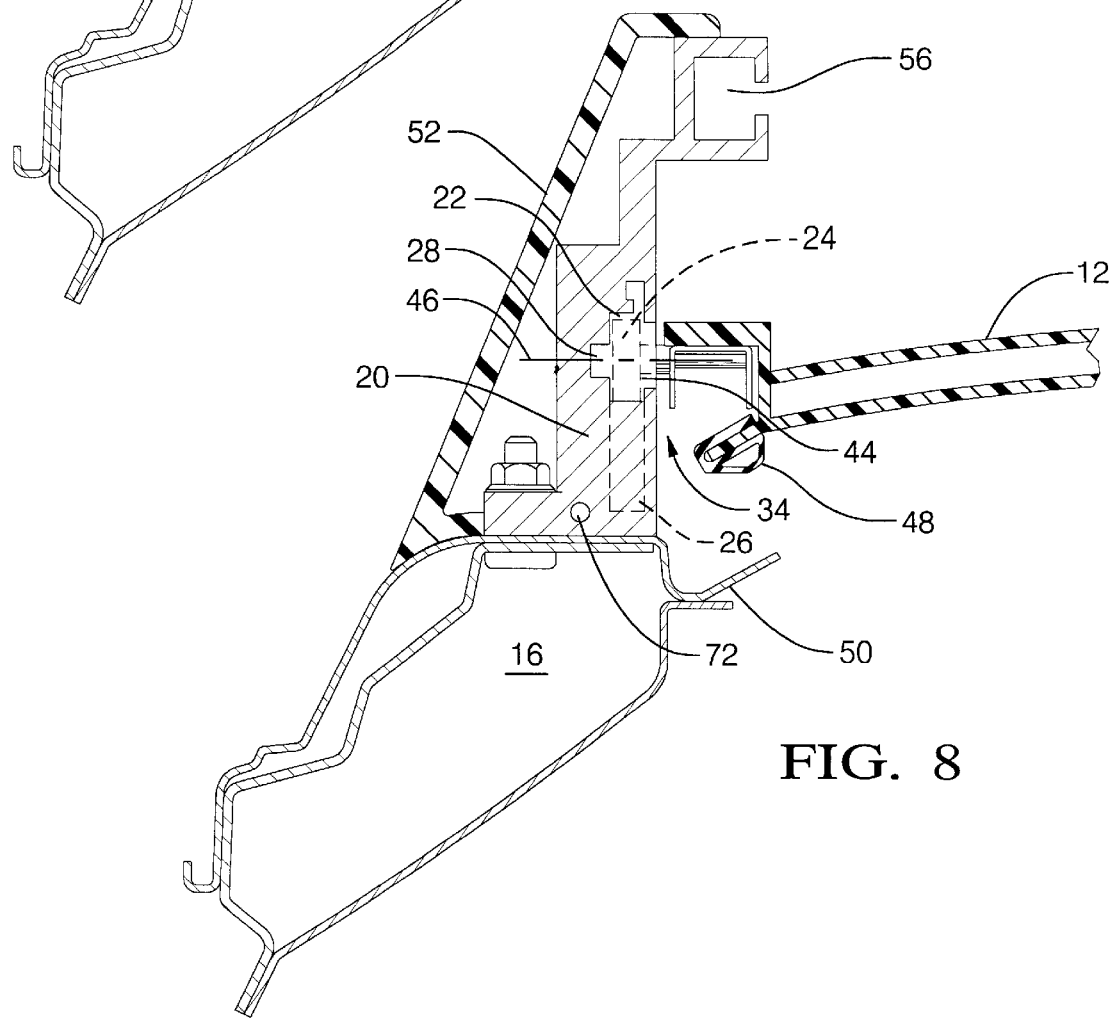
FIG. 8 is a section similar to FIG. 3, of an alternate construction.

The flexible flat cable 78 is looped back upon itself between electrical connectors 80 and 82 to accommodate the travel of moveable roof panel 12 as best shown in FIGS. 3 and 5. Roof panel 12 and rail 20 preferably include inner and outer respective channels 88 and 90 that cooperate to house the flexible flat cable 78. These channels can be eliminated in the case of a manually operated moveable roof panel as shown in FIG. 8.

Suitable motor controls are well known in the art and need not be described in detail. Briefly roof panel 12 is opened by operating a suitable three-way control switch or the like in the passenger compartment of vehicle 10 (not shown) that sends a suitable signal to motor controller 76. The motor controller 76 then energizes electric motor 62 from a suitable power source such as the vehicle battery (not shown), to drive sprocket 66 in the counter clockwise direction. This pulls the moveable roof panel 12 to the fully open position shown in FIG. 2 whereupon the motor stalls and deenergizes. Roof panel is closed by operating the control switch (not shown) so that a suitable signal is sent to motor controller 76 to rotate electric motor in the opposite or clockwise direction. This drives sprocket 66 clockwise pushing the moveable roof panel 12 aft to the fully closed position shown in FIG. 4. The motor stalls in the closed position, thus deenergizing electric motor 62.

As indicated, power operation is optional and the invention contemplates an automotive vehicle that has a moveable roof panel 12 that is manually operated. See FIG. 3 discussed above. Moreover, the rearward tracks 24 and the rearward roller assemblies 34 can be replaced by tracks and roller assemblies that are the same as the forward tracks 22 and forward roller assemblies 32. On the other hand, the forward tracks 22 and forward roller assemblies 22 can be replaced by tracks and roller assemblies that are the same as the rearward tracks 24 and rearward roller assemblies 34. In other word, the disclosed embodiment is representative of a presently preferred form of the invention, and is intended to be illustrative rather than definitive thereof. The invention is defined in the claims.

We claim:

1. An automotive vehicle having a moveable roof comprising:

a vehicle body having laterally spaced longitudinal structures defining a roof line of the automotive vehicle, a fixed roof panel secured to the longitudinal structures, a moveable roof panel, rails attached to the respective longitudinal structures for guiding the moveable roof panel between an open position above the fixed roof panel and a closed position aligned behind the fixed roof panel, the rails having forward tracks and rearward tracks, the forward tracks having drops at aft ends of the forward tracks, the rearward tracks having drops at aft ends of the rearward tracks, the moveable roof panel having forward roller assemblies having rollers that travel in the forward tracks of the rails, and the moveable roof panel having rearward roller assemblies having rollers that travel in the rearward tracks of the rails.

2. The automotive vehicle as defined in claim 1 wherein the rollers of the forward roller assemblies travel in the forward tracks of the rails exclusively and the rollers of the rearward roller assemblies travel in the rearward tracks exclusively.

3. The automotive vehicle as defined in claim 1 wherein one of the forward roller assemblies and the rearward roller assemblies have forward and rearward rollers that travel in one of the forward tracks and the rearward tracks and guide rollers that travel in guide grooves in the one of the forward tracks and the rearward tracks.

4. The automotive vehicle as defined in claim 3 wherein the forward rollers are supported on pivotal links so that the rearward rollers roll into the drops guided by the guide rollers while the forward rollers roll into an overhead position to press the rearward rollers down into the drops.

5. The automotive vehicle as defined in claim 4 wherein the rails have third tracks above the first and second tracks and the automotive vehicle further comprises at least one cross member that is secured in the third tracks of the rails.

6. The automotive vehicle as defined in claim 5 wherein the one cross member is one of a plurality of cross members that are adjustably secured in the third tracks of the rails to provide a luggage carrier.

7. The automotive vehicle as defined in claim 1 further comprising a drive unit for moving the moveable roof panel between the open position and the closed position, the drive unit comprising an electrical motor, a motor controller and sensors at the forward and aft ends of the moveable roof panel.

* * * * *